(12) United States Patent
Yoo

(10) Patent No.: US 10,821,319 B2
(45) Date of Patent: Nov. 3, 2020

(54) TREADMILL

(71) Applicant: DRAX INC., Anyang-si, Gyeonggi-do (KR)

(72) Inventor: Seon Kyung Yoo, Seoul (KR)

(73) Assignee: DRAX Inc., Gyeonggi-do (KR)

( * ) Notice: Subject to any disclaimer, the term of this patent is extended or adjusted under 35 U.S.C. 154(b) by 19 days.

(21) Appl. No.: 16/179,761

(22) Filed: Nov. 2, 2018

(65) Prior Publication Data
US 2019/0070454 A1 Mar. 7, 2019

Related U.S. Application Data

(63) Continuation of application No. PCT/KR2017/004563, filed on Apr. 28, 2017.

(30) Foreign Application Priority Data

May 4, 2016 (KR) .................. 10-2016-0055765

(51) Int. Cl.
*A63B 22/02* (2006.01)
*F16F 1/40* (2006.01)
(Continued)

(52) U.S. Cl.
CPC .......... *A63B 22/0214* (2015.10); *A63B 22/02* (2013.01); *A63B 22/0221* (2015.10);
(Continued)

(58) Field of Classification Search
CPC . A63B 22/00; A63B 22/0207; A63B 22/0214; A63B 22/0221; A63B 22/0235;
(Continued)

(56) References Cited

U.S. PATENT DOCUMENTS

| 8,343,016 B1 | 1/2013 | Astilean |
| 8,721,504 B2 | 5/2014 | Wang |
| 9,562,582 B2 * | 2/2017 | Sprainis .................. F16F 1/40 |

FOREIGN PATENT DOCUMENTS

| CN | 102908752 A | 2/2013 |
| CN | 204502265 U | 7/2015 |

(Continued)

OTHER PUBLICATIONS

Espacenet, English Translation of KR 20090075896 A, 2009, http://translationportal.epo.org/emtp/translate/?ACTION=description-retrieval&COUNTRY=KR&ENGINE=google&FORMAT=docdb&KIND=A&LOCALE=en_EP&NUMBER=20090075896&OPS=ops.epo.org/3.2&SRCLANG=ko&TRGLANG=en (Year: 2009).*

(Continued)

*Primary Examiner* — Andrew S Lo
(74) *Attorney, Agent, or Firm* — Knobbe Martens Olson & Bear LLP

(57) ABSTRACT

Provided is a treadmill. The treadmill includes a shock absorbing portion configured to absorb a shock applied to a deck. The shock absorbing portion includes a second anti-vibration rubber portion having a third surface fixed to a frame and a fourth surface fixed to the deck. The third and fourth surfaces are perpendicular to a plate surface direction of the deck. The second anti-vibration rubber portion includes a first anti-vibration sub-rubber having the third surface, a second anti-vibration sub-rubber having the fourth surface, and a plate located between the first anti-vibration sub-rubber and the second anti-vibration sub-rubber. The plate located between the first anti-vibration sub-rubber and the second anti-vibration sub-rubber has a greater hardness than the first and second anti-vibration sub-rubbers.

8 Claims, 14 Drawing Sheets

(51) Int. Cl.
*F16F 1/50* (2006.01)
*F16F 3/093* (2006.01)
*F16F 15/08* (2006.01)

(52) U.S. Cl.
CPC ............ *A63B 22/0235* (2013.01); *F16F 1/40* (2013.01); *F16F 1/50* (2013.01); *F16F 3/093* (2013.01); *F16F 15/08* (2013.01)

(58) Field of Classification Search
CPC ......... A63B 22/02–0264; A63B 69/0028–003; F16F 1/00; F16F 1/36; F16F 1/3835; F16F 1/40; F16F 1/403; F16F 1/406; F16F 1/42; F16F 1/422; F16F 1/44; F16F 1/445; F16F 1/50; F16F 1/54; F16F 3/08; F16F 3/087; F16F 3/093; F16F 3/0935; F16F 15/00; F16F 15/02; F16F 15/04; F16F 15/08; F16F 15/085
See application file for complete search history.

(56) References Cited

FOREIGN PATENT DOCUMENTS

| KR | 20-0428778 Y1 | 10/2006 |
| KR | 10-0905049 B1 | 6/2009 |
| KR | 10-2009-0075896 A | 7/2009 |
| KR | 20090075896 A * | 7/2009 |
| KR | 10-1157919 B1 | 6/2012 |

OTHER PUBLICATIONS

Notice of Allowance of corresponding Korean Patent Application No. 10-2016-0055765—2 pages (dated Jan. 26, 2017).
International Search Report of corresponding PCT Application No. PCT/KR2017/004563—5 pages (dated Jul. 24, 2017).
Office Action in corresponding Chinese Patent Application No. 201780041665.9 dated Jan. 14, 2020, 5 pages.

* cited by examiner

TREADMILL

CROSS-REFERENCE TO RELATED APPLICATIONS

This application is a continuation application, and claims the benefit under 35 U.S.C. §§ 120 and 365 of PCT Application No. PCT/KR2017/004563, filed on Apr. 28, 2017, which is hereby incorporated by reference. PCT/KR2017/004563 also claimed priority from Korean Patent Application No. 10-2016-0055765 filed on May 4, 2016 which is hereby incorporated by reference.

BACKGROUND

The present disclosure relates to a treadmill, and more particularly, to a treadmill for allowing a user, who is doing a walking or running exercise on a track belt, to be softly and uniformly supported by a deck across the whole track belt.

A treadmill is an exercise machine called a running machine. Treadmills give the effect of a walking or running exercise in a small space using a belt rotating along an infinite orbit and are thus widely used at homes or in sports centers. Demands for treadmills are ever increasing because treadmills avow users to do a walking or running exercise indoors at proper temperatures even in winter and allow a running speed to be arbitrarily controlled.

SUMMARY

Provided is a treadmill for maintaining soft ground status having a uniform stiffness across a track belt, regardless of the position of a user doing a walking or running exercise on the track belt, and not allowing damage to a shock absorbing portion, thereby having reliable driving performance.

According to an aspect of the present disclosure, a treadmill includes: a frame; a deck having a plate shape and supported by the frame; a track belt rotating in an infinite orbit in a plate surface direction of the deck; and a shock absorbing portion located between the deck and the frame and configured to absorb a shock applied to the deck, wherein the shock absorbing portion includes: a first anti-vibration rubber portion having a first surface and a second surface, the first surface being fixed to the frame, the second surface being fixed to the deck, and the first and second surfaces being parallel with the plate surface direction of the deck; and a second anti-vibration rubber portion having a third surface and a fourth surface, the third surface being fixed to the frame, the fourth surface being fixed to the deck, and the third and fourth surfaces being perpendicular to the plate surface direction of the deck, wherein the second anti-vibration rubber portion includes: a first anti-vibration sub-rubber having the third surface; a second anti-vibration sub-rubber having the fourth surface; and a plate located between the first anti-vibration sub-rubber and the second anti-vibration sub-rubber, the plate having a greater hardness than the first and second anti-vibration sub-rubbers.

Each of the first and second anti-vibration sub-rubbers may have a thickness in a vertical direction to the plate surface direction of the deck greater than a height in a parallel direction with the plate surface direction of the deck.

A distance of shear deformation of the second anti-vibration rubber portion in the vertical direction to the plate surface direction of the deck may be equal to or greater than 3 mm.

The distance of shear deformation of the second anti-vibration rubber portion in the vertical direction to the plate surface direction of the deck may be equal to or less than 30 mm.

A distance of shear deformation of each of the first and second anti-vibration sub-rubbers in the vertical direction to the plate surface direction of the deck may be equal to or less than 15 mm.

The plate may include a metal material.

The treadmill may further include a third plate located in the third surface of the first anti-vibration sub-rubber and a fourth plate located in the fourth surface of the second anti-vibration sub-rubber, wherein the second anti-vibration rubber portion may be fixed to the frame through the third plate and fixed to the deck through the fourth plate.

The third plate may have a first vertical plate parallel with the third surface and a first horizontal plate parallel with the deck.

The fourth plate may have a second vertical plate parallel with the fourth surface and a second horizontal plate parallel with the deck, the second horizontal plate being fixed to the deck.

The third and fourth plates may have a greater hardness than the first and second anti-vibration sub-rubbers.

The treadmill may further include a first plate located in the first surface of the first anti-vibration rubber portion and a second plate located in the second surface of the first anti-vibration rubber portion, wherein the first anti-vibration rubber portion may be fixed to the frame through the first plate and fixed to the deck through the second plate.

The first anti-vibration rubber portion may support front and rear regions of the deck, and the second anti-vibration rubber portion may be located in a central region of the deck.

Other aspects, features, and advantages than those described above will be clear from the accompanying drawings, the claims, and the description of embodiments below.

These general and specific aspects may be embodied using a system, a method, a computer program, or a combination thereof.

According to embodiments of the present disclosure, a treadmill maintains soft ground status having a uniform stiffness across a track belt, regardless of the position of a user doing a walking or running exercise on the track belt, and provides reliable driving performance not allowing damage to a shock absorbing portion.

DETAILED DESCRIPTION

Figure 1:
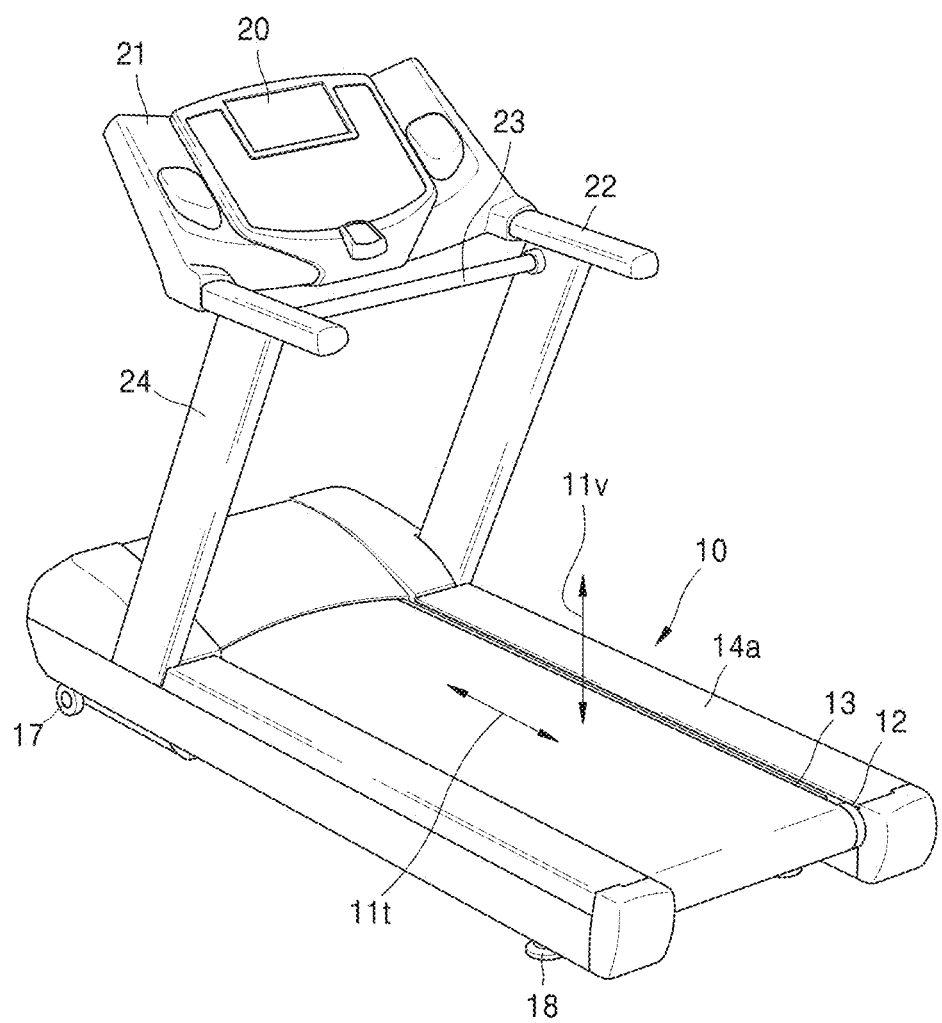
FIG. 1 is a perspective view illustrating the configuration of an example treadmill.
Figure 2:
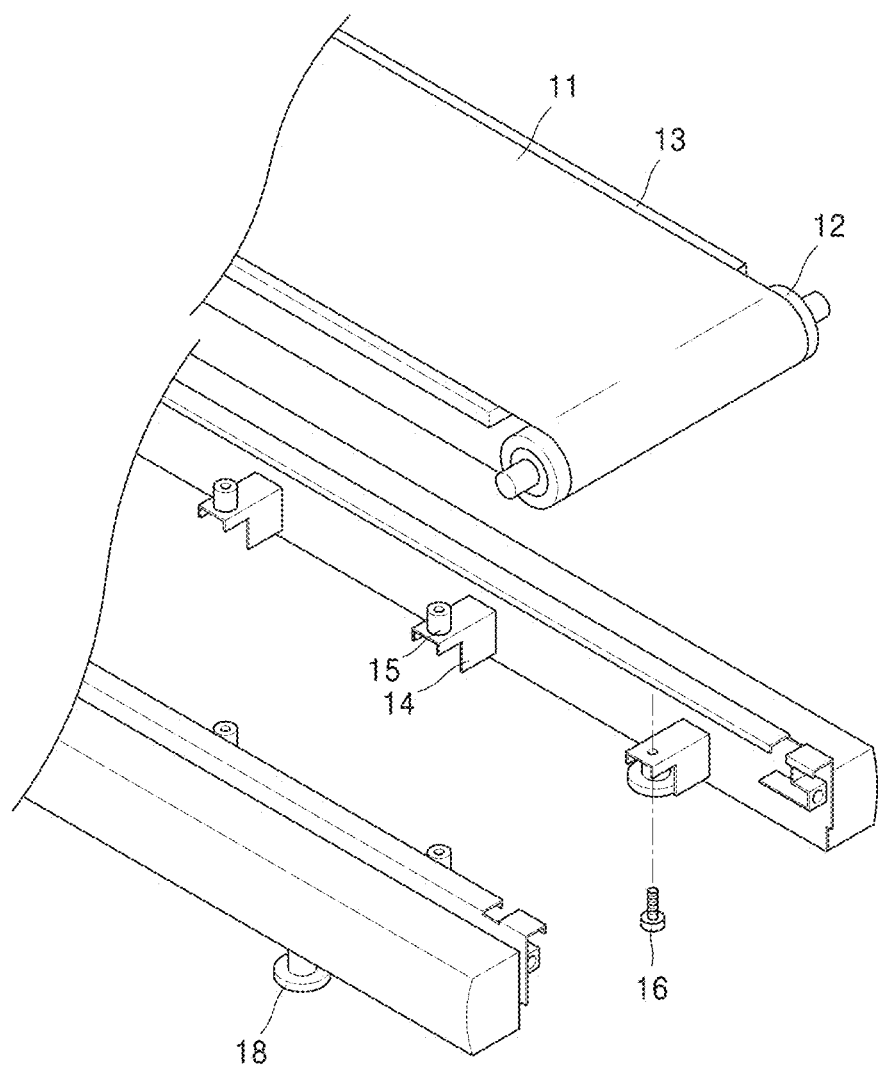
FIG. 2 is an exploded perspective view of a track part in FIG. 1.
Figure 3:
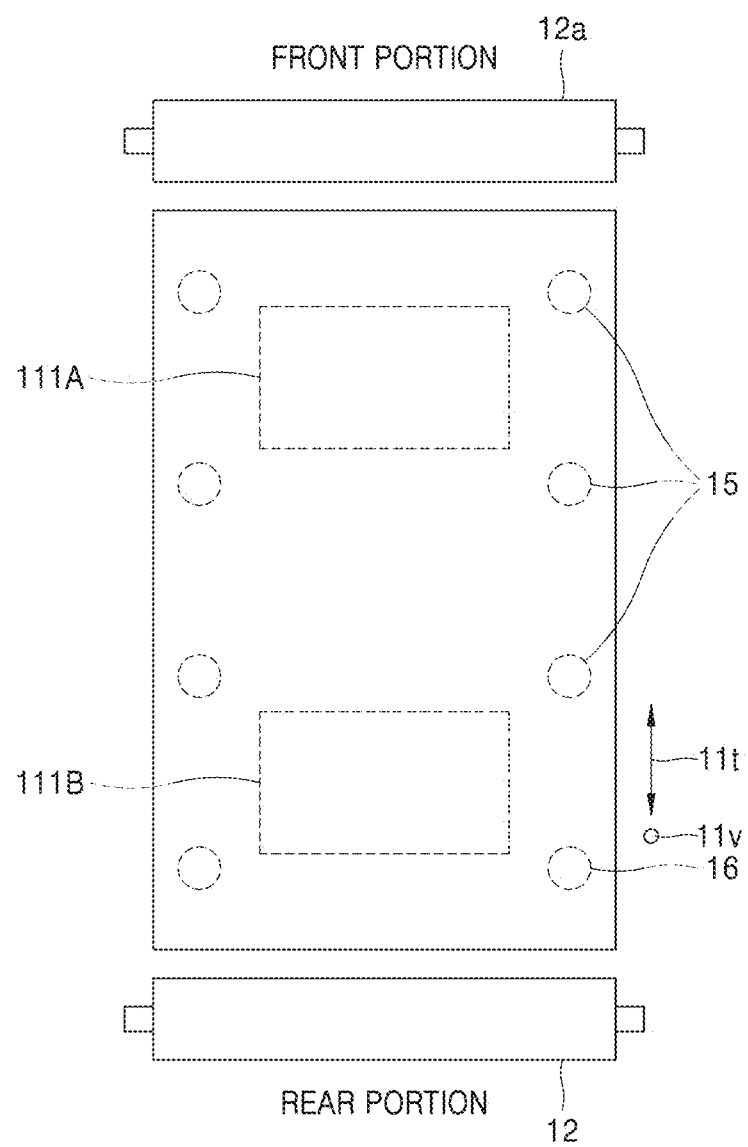
FIG. 3 is a plan view of the surrounding configuration of a deck of the track part in FIG. 1

FIGS. 1, 2 and 3 are diagrams of an example treadmill. Referring to FIGS. 1 through 3, a treadmill 1 includes a track part 10, on which a user climbs up and does a walking or running exercise, and a control panel part 20, which displays or controls operational status of the track part 10.

The track part 10 includes a track belt 11 rotating along an infinite orbit, rollers 12 and 12a supporting and driving the rotation of the track belt 11 at respective opposite ends, a deck 13 which has a quadrangular plate shape and is installed in the track belt 11 to support a load induced by a user's leg motion, a frame 14 which is made of a metal material and is arranged at opposites sides of the track belt 11, an anti-vibration rubber 15 which is provided between the deck 13 and the frame 14 and is installed on a protrusion of the frame 14, a connecting bolt 16 which integrally combines the deck 13 with the frame 14 to prevent the deck 13 from being pushed and moved by the user's leg motion, and supporting portions 17 and 18 which support the track part 10.

The driving roller 12a driving the movement of the track belt 11 and the driven roller 12 guiding the movement of the track belt 11 are installed in a front portion of the track belt 11. The outside of the frame 14 made of a metal material is covered with a deco cover 14a made of a plastic material to produce a sleek aesthetic sense.

The control panel part 20 includes a control panel 21 which allows a user to operate the operational status and displays the operational status, handles 22 which extend from the control panel 21 toward the user, a reinforcing member 23 which connects the handles 22 with each other, and a vertical support 24 which connects the frame 14 with the control panel 21 such that the control panel 21 is installed onto the track part 10.

Meanwhile, a deck supporting structure of an example treadmill is provided such that the anti-vibration rubber 15 having a pillar shape stands between the deck 13 and the frame 14. By forming the anti-vibration rubber 15 in pillar shape, stiffness in a vertical direction 11v is lowered as compared to piling up rubber plates, so that a user is provided with comfort during a running exercise and the knees or joints are prevented from being damaged by a reaction force from the ground.

However, the anti-vibration rubber 15 has much lower stiffness in a shear direction than in a length direction. Accordingly, in the case where the deck 13 is supported on the frame 14 using only the anti-vibration rubber 15 having a pillar shape, it often occurs that the deck 13 is pushed and moved in a horizontal direction 11t the moment that a user kicks off the ground, and therefore, the user is thrown off balance and injured by an effect as if the ground moves while the user is doing a running exercise on the track belt 11.

To overcome this problem, as shown in FIGS. 2 and 3, instead of using the anti-vibration rubber 15 having a pillar shape to lower the stiffness in the vertical direction 11v, the deck 13 and the frame 14 are integrally fixed to each other in a back portion of the track belt 11 using the connecting bolt 16 in the deck supporting structure of the example treadmill so as to prevent the deck 13 from moving in the horizontal direction 11t.

However, although running stability is secured by preventing the deck 13 from being pushed and moved in the horizontal direction 11t by a user's leg motion during the user's walking or running exercise on the track belt 11, running comfort is reduced since the user feels like running on the hard ground when positioning himself/herself in a rear area 111B of the track belt 11 while the user feels like running on the soft ground when positioning himself/herself in a front area 111A of the track belt 11.

Furthermore, as the ground status is different between the front portion and the rear portion of the track belt 11, a reaction force applied to the user's knees or joints increases when the user falls behind a little while travelling on the track belt 11 and decreases when the user moves to the front while travelling on the track belt 11, and therefore, irregular shocks are delivered to the user's joints and so on. As a result, the user easily feels fatigue and has damage to the joints and so on.

The configuration of a treadmill according to embodiments of the present disclosure will be described in detail with reference to the accompanying drawings. In describing the present disclosure, the detailed descriptions of the known functions or configurations will be omitted to make the gist of the present disclosure clear.

Figure 4:
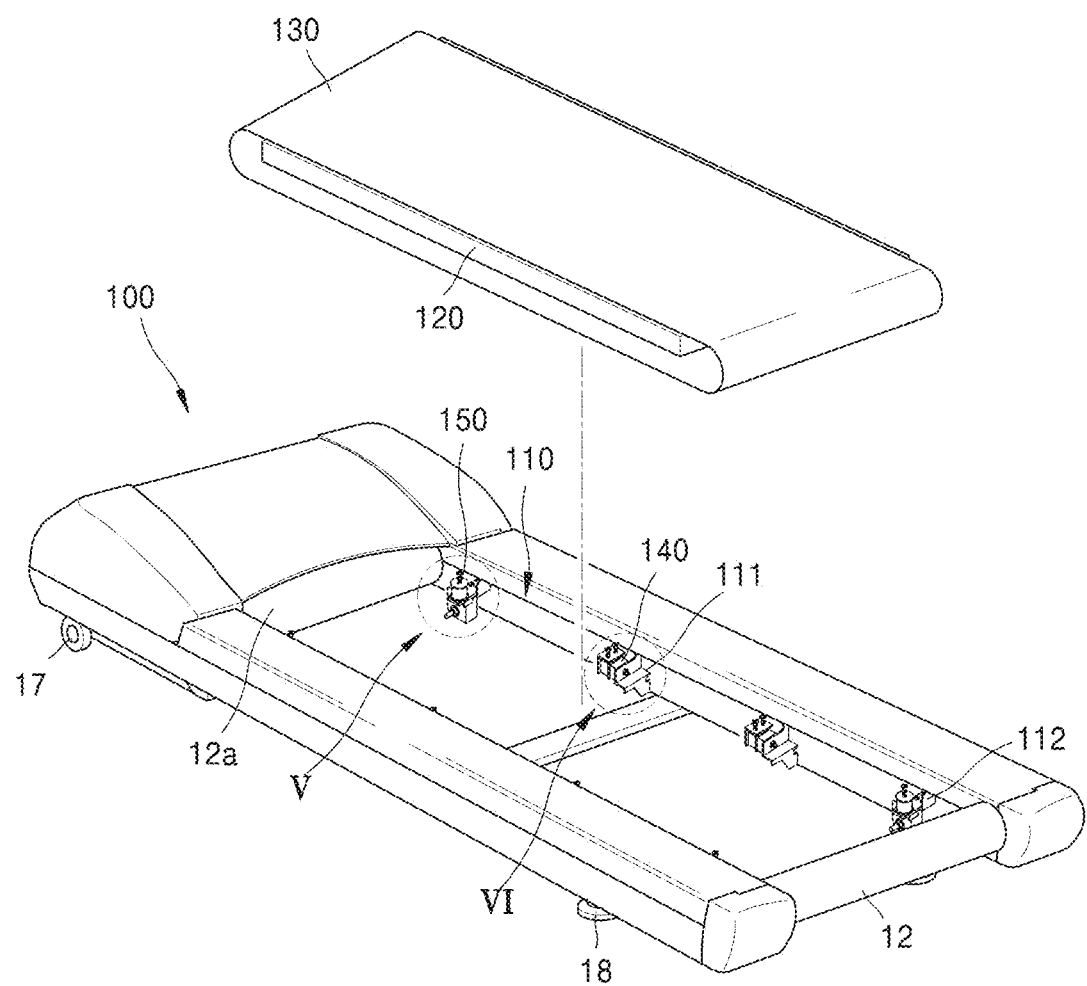
FIG. 4 is a perspective view schematically illustrating a part of a treadmill according to an embodiment.
Figure 5:
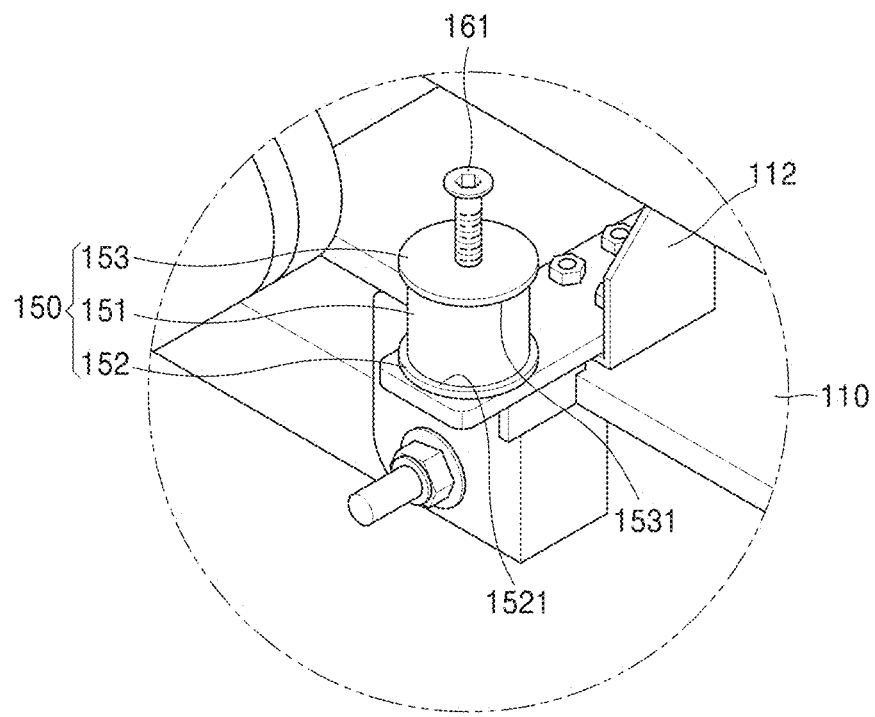
FIG. 5 is an enlarged view of a region including a first anti-vibration rubber portion in FIG. 4.
Figure 6:
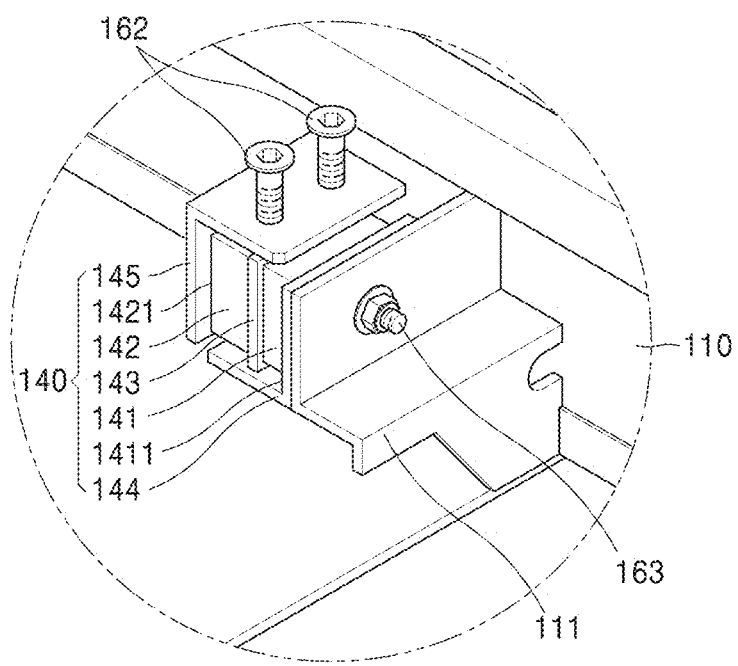
FIG. 6 is an enlarged view of a region including a second anti-vibration rubber portion in FIG. 4.

FIG. 4 is a perspective view schematically illustrating a part of a treadmill 100 according to an embodiment. FIG. 5 is an enlarged view of a region including a first anti-vibration rubber portion (or a first anti-vibration rubber) 150 in FIG. 4. FIG. 6 is an enlarged view of a region including a second anti-vibration rubber portion (or a second anti-vibration rubber) 140 in FIG. 4. For reference, a track part of the treadmill 100 is focused in FIG. 4, and other elements, e.g., a control panel part, is omitted for convenience's sake.

Referring to FIG. 4, the treadmill 100 includes a track part. The treadmill 100 includes a frame 110, a deck 120 which has a plate shape and is supported by the frame 110, and a track belt 130 which rotates in an infinite orbit in a direction of an upper and lower plate surfaces of the deck 120 (hereinafter, referred to as a "plate surface direction of the deck 120").

The frame 110 may include a metal material forming a framework of the track part.

The deck 120 functions as a footboard that supports the weight of a user in the treadmill 100. The rollers 12a and 12, around which the track belt 130 may be wound, may be respectively provided in front and rear directions of the deck 120. The roller 12a provided in the front direction of the deck 120 may be a driving roller, and the roller 12 provided in the rear direction of the deck 120 may be a driven roller.

The track belt 130 may have an endless form and may be wound around the rollers 12 and 12a to rotate and move in an infinite orbit. The track belt 130 may move in the plate surface direction of the deck 120.

The deck 120 is supported by the frame 110. The deck 120 may be supported to be elastically movable with respect to the frame 110. For this, a shock absorbing portion (or a shock absorber) configured to absorb shocks applied to the deck 120 may be provided between the deck 120 and the frame 110.

While a user is doing a running (or walking) exercise on the treadmill 100, shocks applied to the deck 120 by the user. In a procedure in which a user does a running exercise on the track belt 130, when the user takes a step on the track belt 130 which rotates, a shock (or a force) is applied to the deck 120 in a direction (hereinafter, referred to as a "vertical direction of the deck 120") vertical to the plate surface direction of the deck 120 located below the track belt 130. Thereafter, the user's foot is moved together with the track belt 130 horizontally with respect to the deck 120 due to the rotational movement of the track belt 130. At this time, a shock (or a force) is applied to the deck 120 in a direction (hereinafter, referred to as a "horizontal direction of the deck 120) horizontal to the plate surface direction of the deck 120.

The shock absorbing portion is configured to absorb shocks that are applied to the deck 120 by a user in the vertical and horizontal directions of the deck 120. For example, the shock absorbing portion includes the first anti-vibration rubber portion 150 and the second anti-vibration rubber portion 140.

The first anti-vibration rubber portion 150 may mainly absorb shocks applied in the vertical direction of the deck 120, and the second anti-vibration rubber portion 140 may mainly absorb shocks applied in the horizontal direction of the deck 120.

Referring to FIGS. 4 and 5, the first anti-vibration rubber portion 150 is located below the deck 120. For example, the first anti-vibration rubber portion 150 may be located to support front and rear regions of a lower portion of the deck 120.

The first anti-vibration rubber portion 150 includes a first anti-vibration rubber 151 which is elastically deformable. The first anti-vibration rubber portion 150 has a first surface 1521 and a second surface 1531 which are parallel to the plate surface direction of the deck 120. A first plate 152 is provided on the first surface 1521, and a second plate 153 is provided on the second surface 1531. The first plate 152 may be fixed to the first surface 1521 through adhesion, and the second plate 153 may be fixed to the second surface 1531 through adhesion. The hardness of each of the first and second plates 152 and 153 may be greater than that of the first anti-vibration rubber 151. For example, the first plate 152 and the second plate 153 may include a metal material.

The frame 110 may include a first deck supporting body 112 which protrudes toward an inner side where the track belt 130 is laid. The first surface 1521 is fixed to the first deck supporting body 112 of the frame 110 through the first plate 152, and the second surface 1531 is fixed to the deck 120 through the second plate 153. The second plate 153 may be fixed to the deck 120 using a first fixing bolt 161.

When a shock is applied to the deck 120 in the vertical direction, the first anti-vibration rubber portion 150 may be compressed such that the first surface 1521 and the second surface 1531 become closer to each other. In this operation, the shock applied to the deck 120 may be absorbed.

Referring to FIGS. 4 and 6, the second anti-vibration rubber portion 140 is located below the deck 120. For example, the second anti-vibration rubber portion 140 may be located in a central region of the lower portion of the deck 120.

The second anti-vibration rubber portion 140 has a third surface 1411 and a fourth surface 1421, which are perpendicular to the plate surface direction of the deck 120. The third surface 1411 and the fourth surface 1421 are parallel with each other. A third plate 144 is provided on the third surface 1411, and a fourth plate 145 is provided on the fourth surface 1421. The third plate 144 may be fixed to the third surface 1411 through adhesion, and the fourth plate 145 may be fixed to the fourth surface 1421 through adhesion. The third plate 144 and the fourth plate 145 may include a metal material.

The frame 110 may include a second deck supporting body 111 which protrudes toward the inner side where the track belt 130 is laid. The third surface 1411 may be fixed to the second deck supporting body 111 through the third plate 144, and the fourth surface 1421 may be fixed to the deck 120 through the fourth plate 145.

The third plate 144 may be fixed to the second deck supporting body 111 using a second fixing bolt 163. The third plate 144 may have a vertical plate parallel with the third surface 1411 and a horizontal plate parallel with a bottom surface of the deck 120. For example, the third plate 144 may have an L-shape. The vertical plate of the third plate 144 may be fixed to the second deck supporting body 111 using the second fixing bolt 163. The horizontal plate of the third plate 144 may function as a stopper during the movement of the fourth plate 145. However, the shape of the third plate 144 is not limited thereto, and it is apparent that a separate connecting member may be provided between the second deck supporting body 111 and the third plate 144 when necessary.

The fourth plate 145 may have a vertical plate parallel with the fourth surface 1421 and a horizontal plate parallel with the bottom surface of the deck 120. For example, the fourth plate 145 may have an L-shape. The horizontal plate of the fourth plate 145 may be fixed to the deck 120 using a third fixing bolt 162. However, the shape of the fourth plate 145 is not limited thereto, and it is apparent that a separate connecting member may be provided between the deck 120 and the fourth plate 145 when necessary.

When a shock is applied to the deck 120 in the horizontal direction, the second anti-vibration rubber portion 140 may be compressed such that the third surface 1411 and the fourth surface 1421 become closer to each other. In this operation, the shock applied to the deck 120 may be absorbed.

As described above, the first anti-vibration rubber portion 150 mainly absorbs shocks that are applied to the deck 120 in the vertical direction of the deck 120, and the second anti-vibration rubber portion 140 mainly absorbs shocks that are applied to the deck 120 in the horizontal direction of the deck 120.

However, the second surface 1531 of the first anti-vibration rubber portion 150 is fixed to the deck 120, and the fourth surface 1421 of the second anti-vibration rubber portion 140 is fixed to the deck 120. Accordingly, when the deck 120 moves due to a shock applied to the deck 120, the second surface 1531 of the first anti-vibration rubber portion 150 and the fourth surface 1421 of the second anti-vibration rubber portion 140 move together with the deck 120.

When the deck 120 moves in the vertical direction due to a shock applied to the deck in the vertical direction, the second surface 1531 of the first anti-vibration rubber portion 150 and the fourth surface 1421 of the second anti-vibration rubber portion 140 move in the vertical direction. At this time, the vertical movement of the fourth surface 1421 of the second anti-vibration rubber portion 140 is parallel with the third surface 1411, and therefore, shear stress is applied to the second anti-vibration rubber portion 140. In other words, shear stress is applied to the second anti-vibration rubber portion 140 due to a shock applied to the deck 120 in the vertical direction.

When the deck 120 moves in the horizontal direction due to a shock applied to the deck in the horizontal direction, the second surface 1531 of the first anti-vibration rubber portion 150 and the fourth surface 1421 of the second anti-vibration rubber portion 140 move in the horizontal direction. At this time, the horizontal movement of the second surface 1531 of the first anti-vibration rubber portion 150 is parallel with the first surface 1521, and therefore, shear stress is applied to the first anti-vibration rubber portion 150. In other words, shear stress is applied to the first anti-vibration rubber portion 150 due to a shock applied to the deck 120 in the horizontal direction.

In a process in which a user is doing an exercise on the treadmill 100, a shock applied to the deck 120 in the vertical direction may be greater than that applied to the deck in the horizontal direction. Accordingly, a greater shear stress may be applied to the second anti-vibration rubber portion 140 than to the first anti-vibration rubber portion 150.

In an embodiment, the treadmill 100 provides a structure, in which the second anti-vibration rubber portion 140 is shear deformable in the vertical direction without being damaged even when a relatively greater shear stress is applied to the second anti-vibration rubber portion 140.

Figure 7:
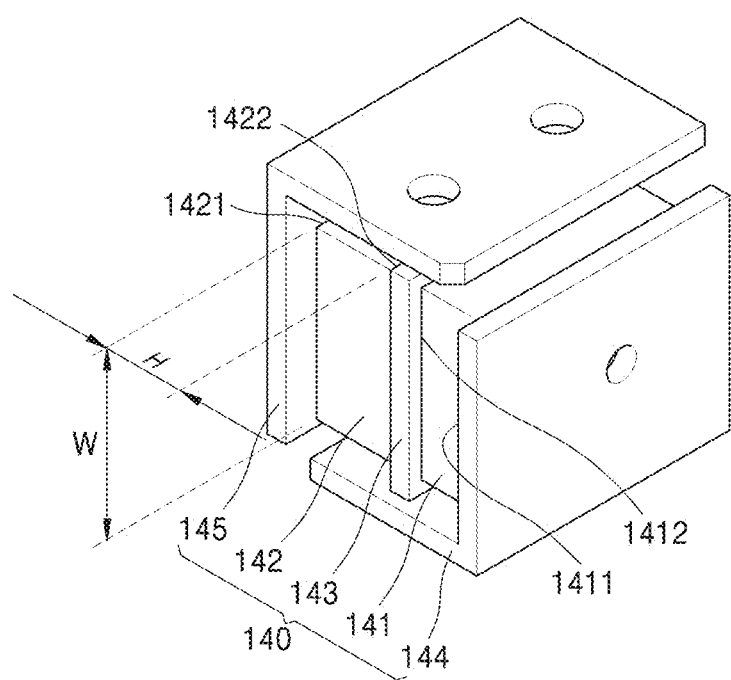
FIG. 7 is a diagram of the second anti-vibration rubber portion in FIG. 6.
Figure 8A:
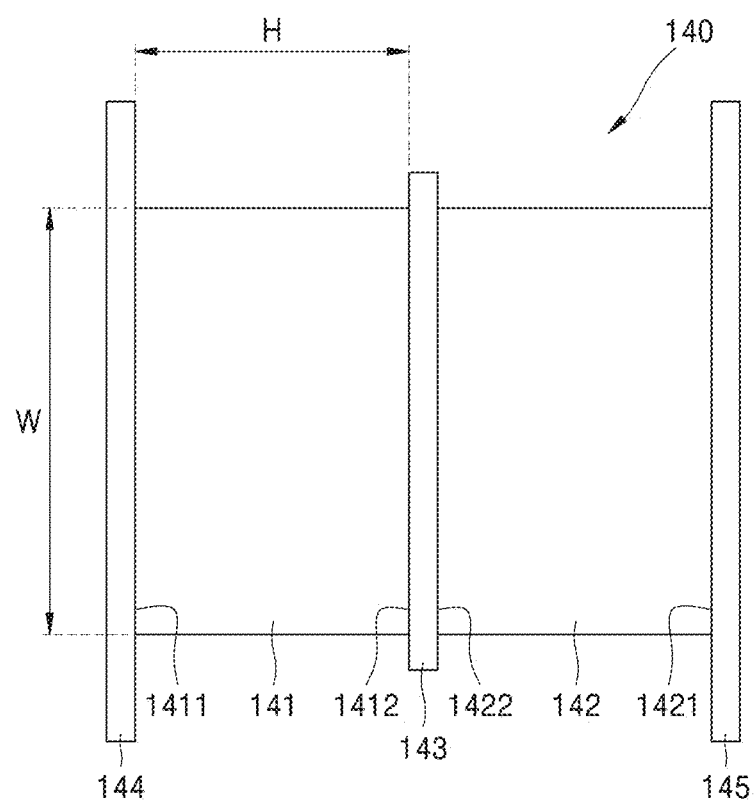
FIGS. 8A and 8B conceptually illustrate a state of the second anti-vibration rubber portion of FIG. 7 before an external force is applied to the second anti-vibration rubber portion in a vertical direction and a state of the second anti-vibration rubber portion deformed by the external force, respectively.
Figure 8B:
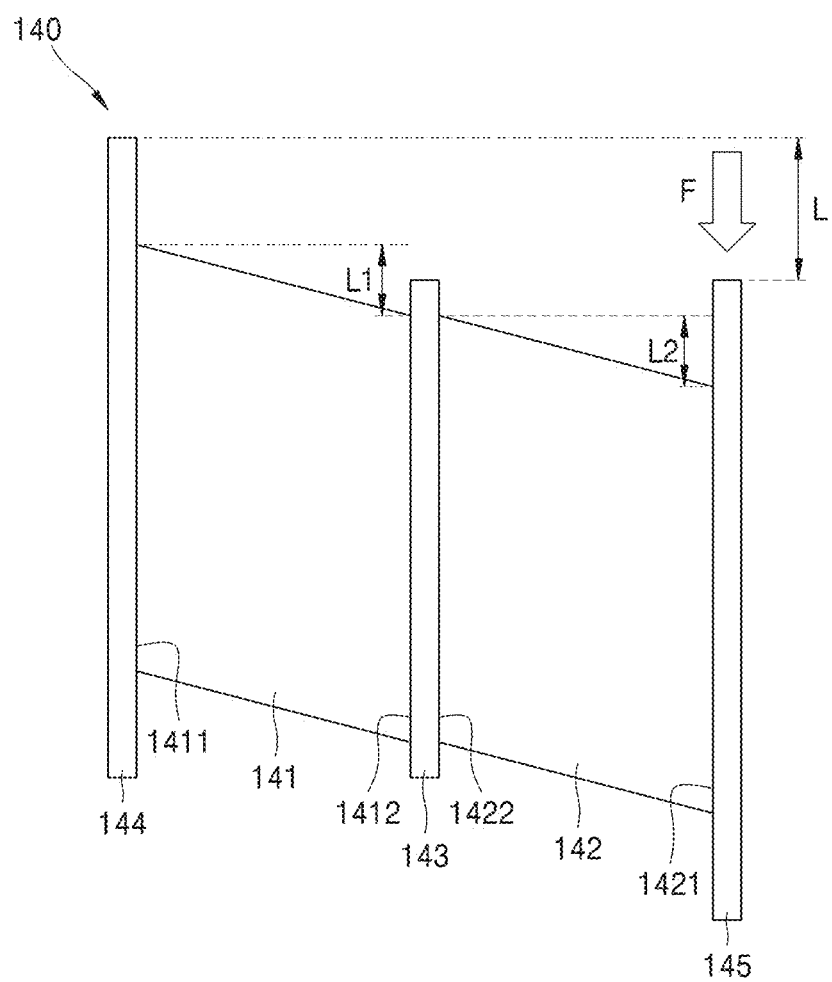

FIG. 7 is a diagram of the second anti-vibration rubber portion 140 in FIG. 6. FIGS. 8A and 8B conceptually illustrate a state of the second anti-vibration rubber portion 140 of FIG. 7 before an external force F is applied to the second anti-vibration rubber portion 140 in the vertical direction and a state of the second anti-vibration rubber portion 140 deformed by the external force F, respectively. For convenience's sake in the description, a partial configuration of the third plate 144 and the fourth plate 145 in FIG. 7 is omitted.

Referring to FIG. 7, the second anti-vibration rubber portion 140 includes a first anti-vibration sub-rubber 141, a second anti-vibration sub-rubber 142, and a plate 143 located therebetween.

The first anti-vibration sub-rubber 141 has the third surface 1411 and a fifth surface 1412 parallel with the third surface 1411. The third surface 1411 is fixed to the third plate 144, and the fifth surface 1412 is fixed to the plate 143. The fifth surface 1412 may be fixed to the plate 143 through adhesion.

The second anti-vibration sub-rubber 142 has the fourth surface 1421 and a sixth surface 1422 parallel with the fourth surface 1421. The fourth surface 1421 is fixed to the fourth plate 145, and the sixth surface 1422 is fixed to the plate 143. The sixth surface 1422 may be fixed to the plate 143 through adhesion.

Each of the first and second anti-vibration sub-rubbers 141 and 142 may have a quadrangular cross-sectional shape in a direction vertical to the direction of the rotational movement of the track belt 130. However, the cross-sectional shape of the first and second anti-vibration sub-rubbers 141 and 142 is not limited thereto and may be circular or polygonal.

The first and second anti-vibration sub-rubbers 141 and 142 may have the same shape and size as each other. Alternatively, at least one of the shape and the size may be different between the first and second anti-vibration sub-rubbers 141 and 142.

A thickness W in the vertical direction may be greater than a height H in the horizontal direction in the first and second anti-vibration sub-rubbers 141 and 142. For example, the thickness W in the vertical direction may be greater than 1.5 times the height H in the horizontal direction in the first and second anti-vibration sub-rubbers 141 and 142.

The first anti-vibration sub-rubber 141 and the second anti-vibration sub-rubber 142 may include a rubber material. The material characteristics, e.g., the modulus of elasticity, of the first and second anti-vibration sub-rubbers 141 and 142 may be the same as those of the first anti-vibration rubber portion 150. However, the material characteristics of the first and second anti-vibration sub-rubbers 141 and 142 are not limited thereto and may be different from those of the first anti-vibration rubber 151.

The plate 143 is located between the fifth surface 1412 of the first anti-vibration sub-rubber 141 and the sixth surface 1422 of the second anti-vibration sub-rubber 142. The plate 143 may support the fifth surface 1412 of the first anti-vibration sub-rubber 141 and the sixth surface 1422 of the second anti-vibration sub-rubber 142. The plate 143 may be parallel with the third surface 1411 and the fourth surface 1421.

The plate 143 may have a greater hardness than each of the first and second anti-vibration sub-rubbers 141 and 142. For example, the plate 143 may include a metal material. For example, the plate 143 may be an iron plate. When the plate 143 is an iron plate, the plate 143 may be easily fixed to the first and second anti-vibration sub-rubbers 141 and 142 through adhesion. The material of the plate 143 may be the same as that of the second deck supporting body 111 but is not limited thereto. It is apparent that the material of the plate 143 may be different from that of the second deck supporting body 111.

Hereinafter, deformation occurring when shear stress is applied to the second anti-vibration rubber portion 140, which includes a plurality of anti-vibration sub-rubbers 141 and 142 and the plate 143 located therebetween, will be described.

Referring to FIGS. 8A and 8B, as the external force F is applied to the deck 120 in the vertical direction, the deck 120 is moved in the vertical direction, and the fifth surface 1412 of the first anti-vibration sub-rubber 141 and the fourth surface 1421 of the second anti-vibration sub-rubber 142 are moved in the vertical direction.

A distance L, by which the fourth surface 1421 is vertically moved with respect to the third surface 1411 in the second anti-vibration rubber portion 140, is equal to the sum L1+L2 of a distance L1, by which the fifth surface 1412 is vertically moved with respect to the third surface 1411 in the first anti-vibration sub-rubber 141, and a distance L2, by which the fourth surface 1421 is vertically moved with respect to the sixth surface 1422 in the second anti-vibration sub-rubber 142.

In other words, when the external force F is applied to the deck 120 in the vertical direction, a vertical moving distance of the second anti-vibration rubber portion 140 may be distributed by the first anti-vibration sub-rubber 141 and the second anti-vibration sub-rubber 142. Accordingly, the distance L of vertical shear deformation of the second anti-vibration rubber portion 140 may be equal to or greater than 3 mm. The distance L of vertical shear deformation of the second anti-vibration rubber portion 140 may be equal to or less than 30 mm. The distances L1 and L2 of vertical shear deformation of the respective first and second anti-vibration sub-rubbers 141 and 142 may be equal to or less than 15 mm. Here, the distance of shear deformation may be defined as a distance by which deformation by shear stress is available with no damage occurring.

Figure 9A:
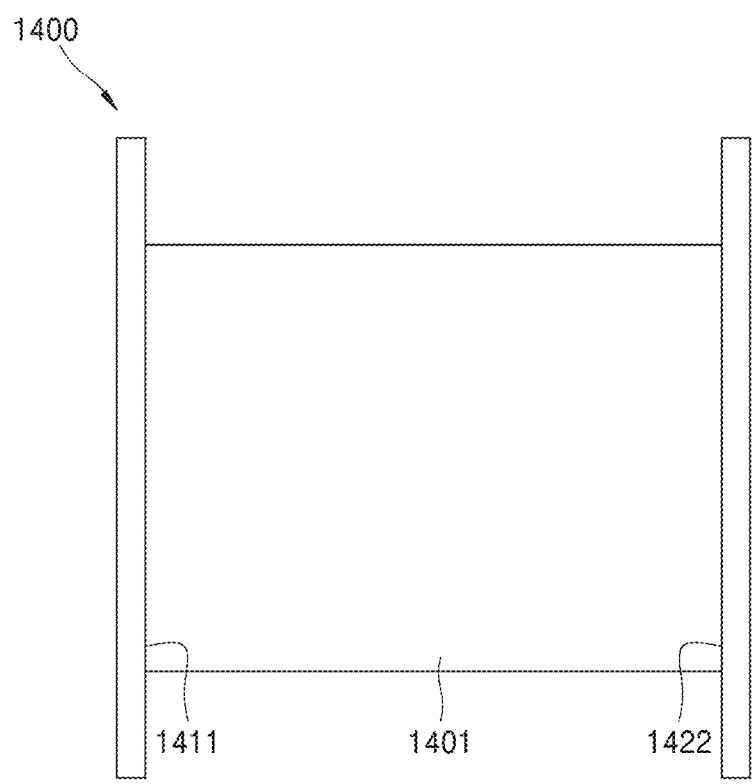
FIGS. 9A and 9B are each cross-sectional views of a second anti-vibration rubber portion before and after an external force is applied to the second anti-vibration rubber portion in a comparative example.
Figure 9B:
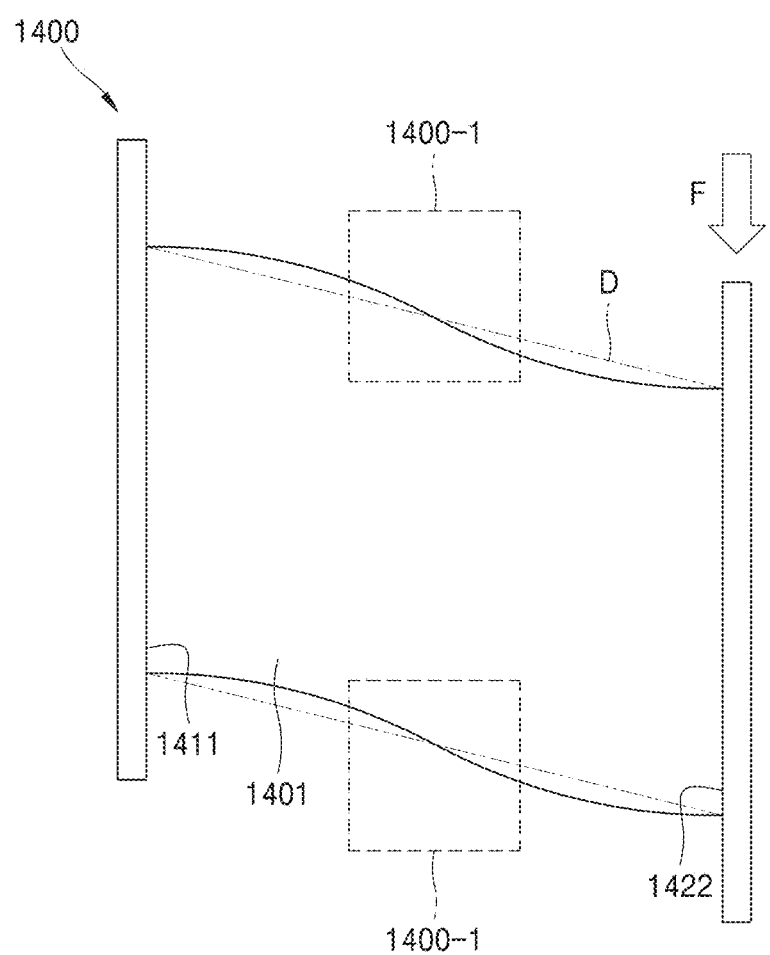

FIGS. 9A and 9B are each cross-sectional views of a second anti-vibration rubber portion 1400 before and after the external force F is applied to the second anti-vibration rubber portion 1400 in a comparative example.

Referring to FIGS. 9A and 9B, in the case where an anti-vibration rubber 1401 having a single body is used as the second anti-vibration rubber portion 1400 unlike the present disclosure, totally different deformation appears when the external force F is applied to the deck 120 in the vertical direction.

The second anti-vibration rubber portion 1400 is not bent at a uniform angle as shown by a broken line D but is bent at different angles in different regions. For example, referring to FIG. 9B, the second anti-vibration rubber portion 1400 is bent at relatively smaller angles in regions close to the third surface 1411 and the fourth surface 1422 but is sharply bent in a region, e.g., a central region 1400-1, far from the third surface 1411 and the fourth surface 1422. When the anti-vibration rubber 1401 is sharply bent as in the central region 1400-1, the anti-vibration rubber 1401 may be damaged.

However, according to an embodiment, the second anti-vibration rubber portion 140 uses the plurality of first and second anti-vibration sub-rubbers 141 and 142, so that a bent distance of each of the first and second anti-vibration sub-rubbers 141 and 142 may be reduced. Accordingly, sharp bending that occurs as the bent distance increases may be prevented.

Therefore, even through the second anti-vibration rubber portion 140 is moved by at least a certain distance because of the external force F acting in a shear direction, the second anti-vibration rubber portion 140 may be prevented from being damaged.

Figure 10:
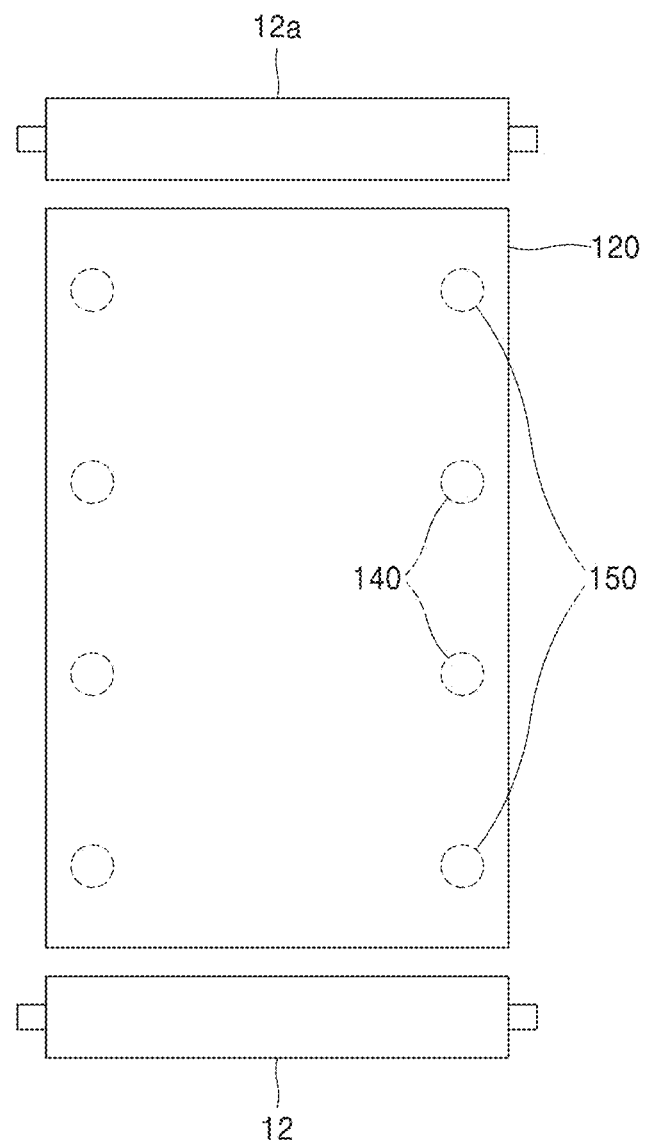
FIG. 10 is a plan view conceptually illustrating the treadmill of FIG. 4.
Figure 11:
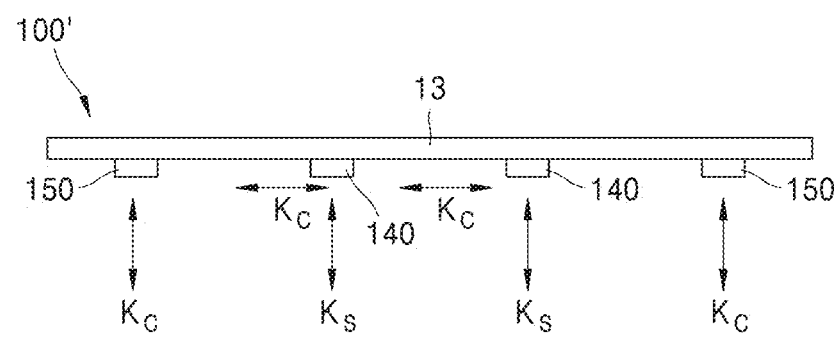
FIG. 11 is a side view of FIG. 10.

First anti-vibration rubber portions 150 and second anti-vibration rubber portions 140 may be distributed as shown in FIGS. 10 and 11. In other words, when the second anti-vibration rubber portions 140 that vertically support the deck 120 through shear deformation are located in a central portion of the track belt 130 in a back-and-forth direction, the deck 120 may be effectively prevented from being pushed and moved in the plate surface direction by a user's leg motion. At the same time, the shape of the first anti-vibration rubber portions 150 is determined such that a compression stiffness $K_C$ of the first anti-vibration rubber portions 150 is similar to a shear stiffness $K_S$ of the second anti-vibration rubber portions 140.

Figure 12:
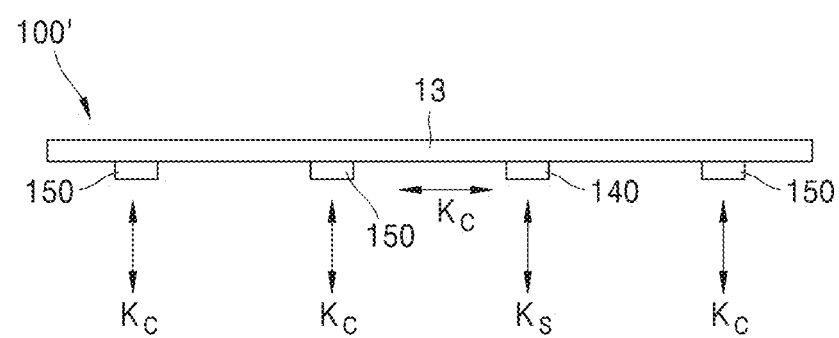
FIG. 12 is a side view of a treadmill according to another embodiment.

Meanwhile, the plurality of second anti-vibration rubber portions 140 may not be necessarily provided as long as the deck 120 is prevented from being pushed and moved in the plate surface direction by a user's leg motion. Accordingly, as shown in a treadmill 100' of FIG. 12, only one second anti-vibration rubber portion 140 may be provided at each of opposite sides of the track belt 130 when the compression stiffness $K_C$ of the second anti-vibration rubber portion 140 is sufficiently high.

Figure 13:
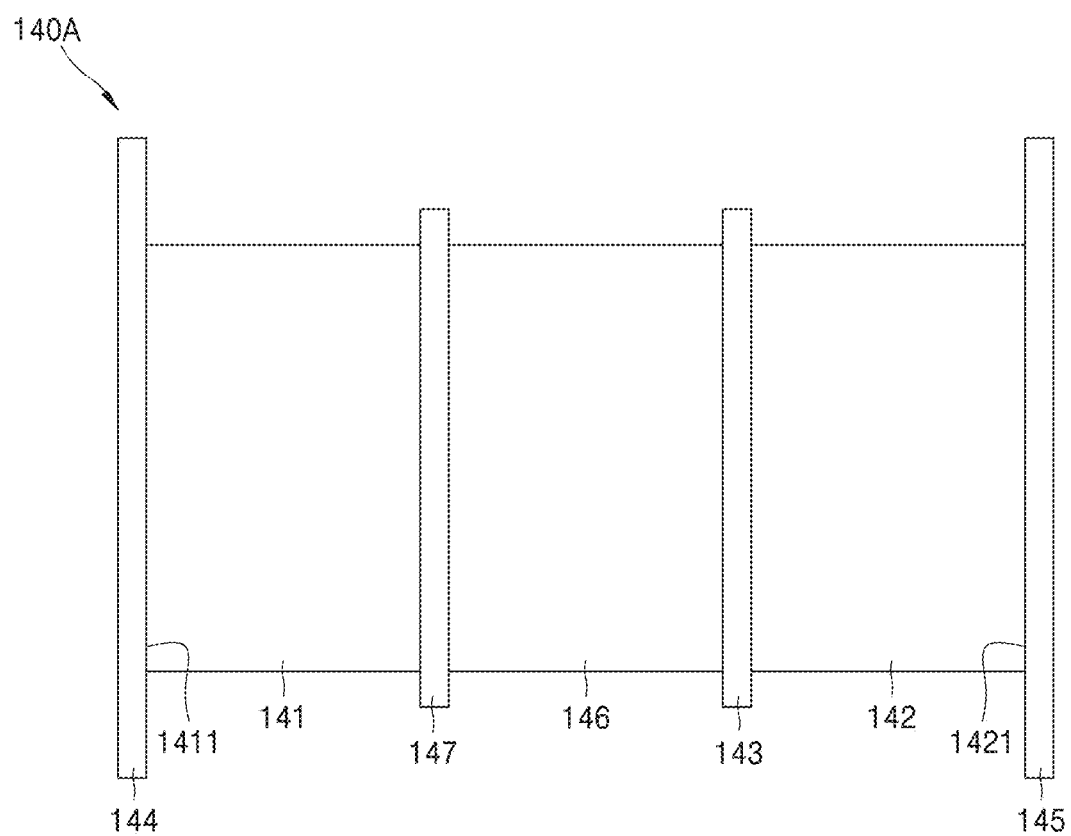
FIGS. 13 and 14 are diagrams of the second anti-vibration rubber portion according to other embodiments.

In the embodiments above, the treadmill 100 has been described focusing on an example in which the second anti-vibration rubber portion 140 includes two anti-vibration sub-rubbers 141 and 142 and one plate 143 located therebetween. However, the numbers of anti-vibration sub-rubbers 141 and 142 and plates 143 included in the second anti-vibration rubber portion 140 of the treadmill 100 are not limited to these embodiments and may be increased. For example, as shown in FIG. 13, a second anti-vibration rubber portion 140A may further include a third anti-vibration sub-rubber 146 located between the first and second anti-vibration sub-rubbers 141 and 142 and a second plate 147 located between the first anti-vibration sub-rubber 141 and the third anti-vibration sub-rubber 146.

Figure 14:
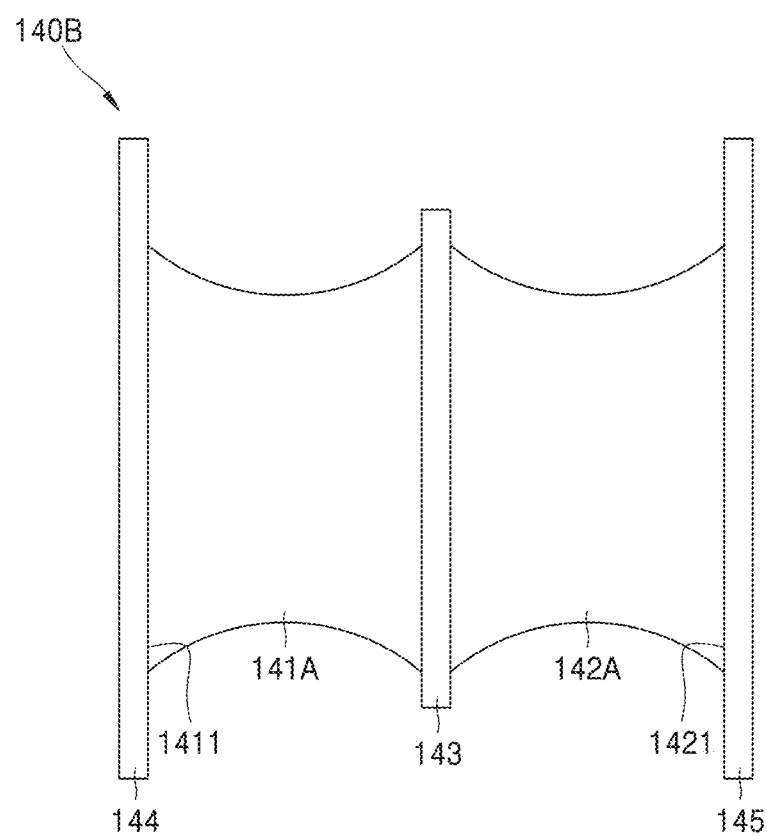

In the embodiments above, the treadmill 100 has also been described focusing on an example in which the first and second anti-vibration sub-rubbers 141 and 142 of the second anti-vibration rubber portion 140 have a uniform vertical thickness in the horizontal direction before an external force is applied to the second anti-vibration rubber portion 140. However, the first and second anti-vibration sub-rubbers 141 and 142 of the second anti-vibration rubber portion 140 are not limited to these embodiments. The vertical thickness of the first and second anti-vibration sub-rubbers 141 and 142 may change in the horizontal direction. For example, as shown in FIG. 14, first and second anti-vibration sub-rubbers 141A and 142A of a second anti-vibration rubber portion 140B may be vertically thick in regions respectively adjacent to the third plate 144, the fourth plate 145, and the plate 143 and may be vertically thin in regions far from the third plate 144, the fourth plate 145, and the plate 143.

Although embodiments of the present disclosure have been described as examples, the scope of the present disclosure is not limited to the disclosed embodiments and can be appropriately modified without departing from the scope defined by the claims Other aspects, features, and advantages than those described above will be clear from the accompanying drawings, the claims, and the description of embodiments below. These general and specific aspects may be embodied using a system, a method, a computer program, or a combination thereof.

What is claimed is:

1. A treadmill comprising:
   a frame;
   a deck having a plate shape and supported by the frame;
   a track belt rotating in an infinite orbit in a plate surface direction of the deck; and
   a shock absorbing portion located between the deck and the frame and configured to absorb a shock applied to the deck,
   wherein the shock absorbing portion comprises:
   a first anti-vibration rubber portion having a first surface and a second surface, the first surface being fixed to the frame, the second surface being fixed to the deck, and the first and second surfaces being parallel with the plate surface direction of the deck; and
   a second anti-vibration rubber portion having a third surface and a fourth surface, the third surface being fixed to the frame, the fourth surface being fixed to the deck, and the third and fourth surfaces being perpendicular to the plate surface direction of the deck,
   wherein the second anti-vibration rubber portion comprises:
   a first anti-vibration sub-rubber having the third surface;
   a second anti-vibration sub-rubber having the fourth surface; and
   a plate located between the first anti-vibration sub-rubber and the second anti-vibration sub-rubber, the plate having a greater hardness than the first and second anti-vibration sub-rubbers, and
   wherein the first anti-vibration sub-rubber, the plate and the second anti-vibration sub-rubber are arranged in order along a horizontal direction parallel to the deck to absorb vertical shocks vertically applied to the deck and horizontal shocks horizontally applied to the deck,
   wherein the second anti-vibration rubber portion comprises:

a first fixture coupled to the frame; and a second fixture coupled to the deck, wherein the plate is interposed between the first fixture and the second fixture, wherein the first anti-vibration sub-rubber is interposed between the first fixture and the plate, wherein the second anti-vibration sub-rubber is interposed between the second fixture and the plate, wherein the first fixture comprises a first base portion and a first extending portion extending upwardly or downwardly from the first base portion, wherein the second fixture comprises a second base portion and a second extending portion extending downwardly or upwardly from the second base portion, wherein the first base portion and the second base portion overlap each other in a direction perpendicular to the plate surface, and wherein the first extending portion and the second extending portion overlap each other in the horizontal direction.

2. The treadmill of claim 1, wherein a distance of shear deformation of the second anti-vibration rubber portion in a direction perpendicular to a plate surface direction of the deck is equal to or greater than 3 mm.

3. The treadmill of claim 2, wherein the distance of shear deformation of the second anti-vibration rubber portion is equal to or less than 30 mm.

4. The treadmill of claim 3, wherein a distance of shear deformation for each of the first and second anti-vibration sub-rubbers in a direction perpendicular to the plate surface is equal to or less than 15 mm.

5. The treadmill of claim 1, wherein the plate comprises a metal material.

6. The treadmill of claim 1, wherein the first anti-vibration rubber portion is located in a front region of the deck, and the second anti-vibration rubber portion is located in a central region of the deck.

7. The treadmill of claim 1, wherein the first base portion and the second base portion face different sides of the first anti-vibration sub-rubber, the second anti-vibration sub-rubber and the plate.

8. The treadmill of claim 1, wherein the first extending portion faces a first surface of the first anti-vibration sub-rubber, and wherein the second extending portion faces a second surface of the second anti-vibration sub-rubber opposite to the first surface of the first anti-vibration sub-rubber.

* * * * *